United States Patent
Hirata et al.

[11] Patent Number: 6,073,245
[45] Date of Patent: Jun. 6, 2000

[54] SKEWING-SUPPRESSIVE OUTPUT BUFFER CIRCUIT

[75] Inventors: Takashi Hirata; Toru Iwata, both of Osaka, Japan

[73] Assignee: Matsushita Electric Industrial Co., Ltd., Osaka, Japan

[21] Appl. No.: 09/234,708

[22] Filed: Jan. 21, 1999

[30] Foreign Application Priority Data

Jan. 22, 1998 [JP] Japan .................................. 10-010225

[51] Int. Cl.⁷ ..................................................... G06F 1/12
[52] U.S. Cl. .......................................... 713/400; 713/503
[58] Field of Search ..................... 713/400, 401, 713/500, 503, 600

[56] References Cited

U.S. PATENT DOCUMENTS

| | | | |
|---|---|---|---|
| 5,243,703 | 9/1993 | Farmwald et al. ....................... | 713/400 |
| 5,371,880 | 12/1994 | Bhattacharya ........................... | 713/400 |
| 5,664,166 | 9/1997 | Isfeld ...................................... | 713/400 |
| 5,822,571 | 10/1998 | Goodrum et al. ....................... | 713/400 |

FOREIGN PATENT DOCUMENTS 6-132807  5/1994  Japan ......................... H03K 19/0175

*Primary Examiner*—Dennis M. Butler
*Attorney, Agent, or Firm*—Eric J. Robinson; Nixon Peabody LLP

[57] ABSTRACT

In an output buffer circuit, an input signal is transmitted through a bus by way of a latch circuit and a driver. A stable-state interval detector detects an interval during which the input signal remains in the same logical state. If the stable-state interval detected is relatively short, a drivability controller controls the drivability of the driver at a normal value. To the contrary, if the interval detected is relatively long, the controller increases the drivability of the driver. In general, if the stable-state interval of an input signal is relatively long, then the time taken for the subsequent logical state transition of the signal tends to be longer as compared with a signal having a shorter stable-state interval. However, if the drivability of the driver is increased, then the state transition time is shortened, and substantially equalized with that of a signal having a relatively short stable-state interval. As a result, signal skewing can be minimized.

6 Claims, 5 Drawing Sheets

SKEWING-SUPPRESSIVE OUTPUT BUFFER CIRCUIT

BACKGROUND OF THE INVENTION

The present invention relates to an output buffer circuit that can suppress skewing.

In recent years, as the transfer rate of data exchanged between two chips has been increased, it has become increasingly important to minimize skewing between a clock signal and a data word transmitted or between two data words transmitted.

In the pertinent prior art, if data words should be transferred at a high rate, skewing, or a phase difference between two signals, has been suppressed by synchronizing the output time of a clock signal with that of a data word using DLL, PLL or the like.

However, the present inventors found that only by synchronizing output times of clock signals and data words as in the prior art, skewing still happens after the synchronization and data words cannot be received just as expected due to skewing if data words are transferred at an even higher rate.

And we found that skewing still occurs after the synchronization of output times, partly because an interval, during which a signal to be transmitted remains in the same logical state (in this specification, such an interval will be called a "stable-state interval"), is of a variable length. Hereinafter, this point will be discussed in greater detail with reference to FIG. 5.

In FIG. 5, CLK denotes a clock signal; Dout1 and Dout2 respective data words output from a driver to a bus on the transmitter end; and Vref a reference voltage used for determining the logical states of data words on the receiver end. The receiver determines a voltage lower than the reference voltage Vref to be L level and a voltage higher than the reference voltage Vref H level. The level of the data word Dout1 starts to rise from L to H in synchronism with the falling edge (time) T1 of the clock signal CLK, and is held at L during an interval preceding the time T1. As can be seen, the data word Dout1 has a long stable-state interval. On the other hand, the level of the data word Dout2 starts to fall from H to L in synchronism with the rising edge (time) T0 of the clock signal CLK, and starts to rise from L to H in synchronism with the next falling edge T1. Accordingly, the interval before the time T1, during which the data word Dout2 is at L level, is relatively short. That is to say, the data word Dout2 has a relatively short stable-state interval. The potential level of the data word Dout1 starts to rise from an L-level potential VL at the time T1 and then reaches an H-level potential VH. In contrast, the potential level of the data word Dout2 starts to fall from the H-level potential VH at the time T0, but does not quite reach the L-level potential VL at the time T1. Instead, at the time T1, the potential level of the data word Dout2 starts to rise from a level higher than the L-level potential VL by a predetermined potential difference Vd. Thus, it takes a longer time for the level of the data word Dout1, having a longer stable-state interval than that of the data word Dout2, to reach the reference voltage Vref from the time T1 as compared with the data word Dout2. In other words, a time lag (i.e., skewing) SKt exists between these data words Dout1 and Dout2. The higher the frequency of the clock signal CLK is and the heavier the load on the bus for transmitting these data words is, the more remarkable this skewing SKt is. As can be understood, even if two data words Dout1 and Dout2 are output at the same time from a driver on the transmitter end, skewing still happens due to a difference in length of the stable-state intervals of these data words.

SUMMARY OF THE INVENTION

A prime object of the present invention is providing an output buffer circuit that can effectively suppress skewing, which ordinarily happens depending on the length of a stable-state interval of a signal.

In order to accomplish this object, according to the present invention, the stable-state interval of a signal is detected and the ability of a driver to drive a bus is changed depending on the length of the stable-state interval detected.

Specifically, the skewing-suppressive output buffer circuit of the present invention includes: means for driving a bus based on a logical state of an input signal; means, receiving the input signal in accordance with a clock signal, for detecting a stable-state interval during which the input signal remains in the same logical state and outputting a signal indicating results of the detection; and means, responsive to the output signal of the detecting means, for controlling the drivability of the driving means based on the length of the stable-state interval detected by the detecting means.

In one embodiment of the present invention, the control means increases the drivability of the driving means if the stable-state interval detected by the detecting means is long.

In another embodiment of the present invention, the detecting means compares a logical state of the input signal, taken in at a predetermined edge of the clock signal, with that of the input signal, taken in at the previous edge of the clock signal, thereby detecting the stable-state interval of the input signal.

In accordance with the present invention, the ability of the driving means to drive the bus is controlled by the drivability control means based on the length of the stable-state interval of the input signal. Accordingly, if the stable-state interval of the input signal is relatively long, i.e., if the subsequent logical state transition of the input signal takes a longer time, then the drivability of the driving means is increased compared with a signal having a shorter stable-state interval. As a result, the logical state transition time of the input signal is shortened. Consequently, the logical state transition intervals of input signals are substantially equalized irrespective of the lengths of stable-state intervals thereof. And data skewing dependent on the stable-state interval of a signal can be suppressed effectively.

DESCRIPTION OF THE PREFERRED EMBODIMENTS

Hereinafter, preferred embodiments of the present invention will be described with reference to the accompanying drawings.

Figure 1:
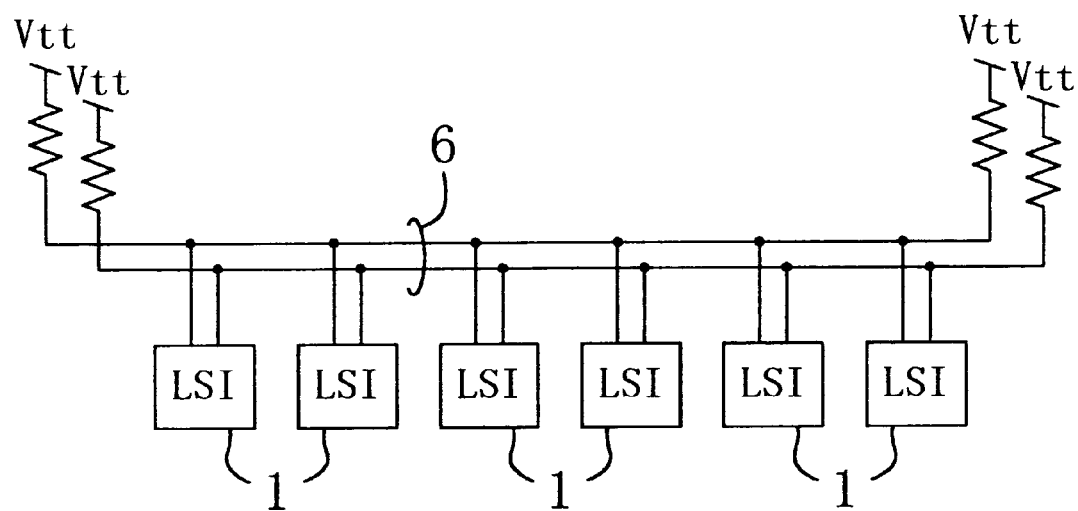
FIG. 1 is a block diagram illustrating an overall configuration of a signal transmission/reception system including an output buffer circuit according to an exemplary embodiment of the present invention.

FIG. 1 schematically illustrates an overall configuration of a signal transmission/reception system. As shown in FIG. 1, six semiconductor integrated circuits (LSI's) 1 are connected to each other via a plurality of buses 6 used in common (in FIG. 1, two buses 6 are shown for the illustrative purpose only). And signals are exchanged among these LSI's 1. In transmitting and receiving a signal between a predetermined pair of LSI's 1, one of the LSI's 1 on the transmitting end drives the potential on the buses 6, while the other LSI 1 on the receiving end senses the potential variation on the buses 6 and receives a signal. The LSI 1 on the transmitting end should drive the capacitance of the buses 6 and the input capacitances of the other five LSI's 1. The larger the number of LSI's 1 connected to the buses 6 (i.e., the longer the length of the buses 6), the larger the capacitance of the buses 6.

Figure 2:
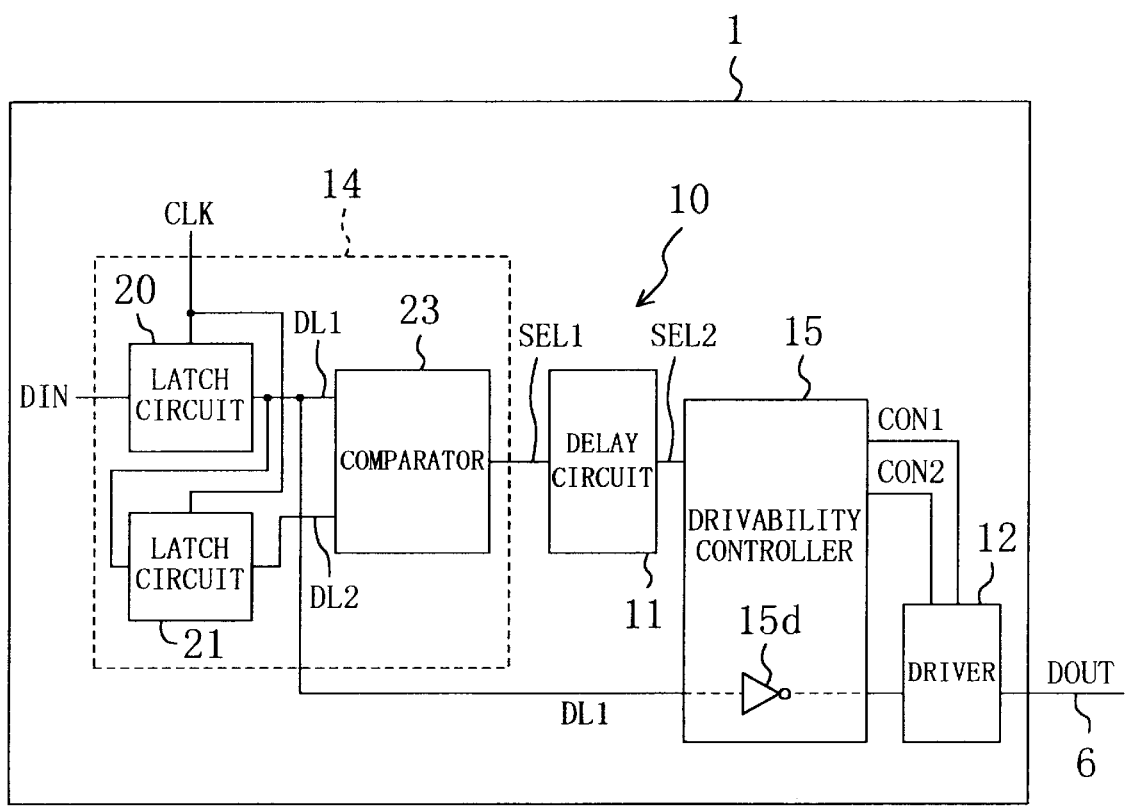
FIG. 2 is a block diagram illustrating a configuration of the output buffer circuit according to the embodiment of the present invention.

As shown in FIG. 2, each LSI 1 includes an output buffer circuit 10 for transmitting a signal. The same number of output buffer circuits 10 as that of the buses 6 are provided. In FIG. 2, only one output buffer circuit 10, associated with one of the buses 6, is illustrated for the sake of simplicity. The output buffer circuit 10 includes: a stable-state interval detector 14 (detecting means); a delay circuit (delay means) 11; a driver (driving means) 12; and a drivability controller (control means) 15. The stable-state interval detector 14 detects, responsive to an input signal DIN, a stable-state interval during which the input signal DIN remains in the same logical state. The delay circuit 11 delays the output signal SEL1 of the stable-state interval detector 14 for a predetermined time, thereby outputting a delayed signal SEL2. The driver 12 receives the output signal DL1 of a latch circuit 20 (to be described below) included in the stable-state interval detector 14 and outputs the signal DL1 to the bus 6. The drivability controller 15 increases or decreases the drivability of the driver 12 based on the length of the stable-state interval detected by the stable-state interval detector 14.

Figure 4:
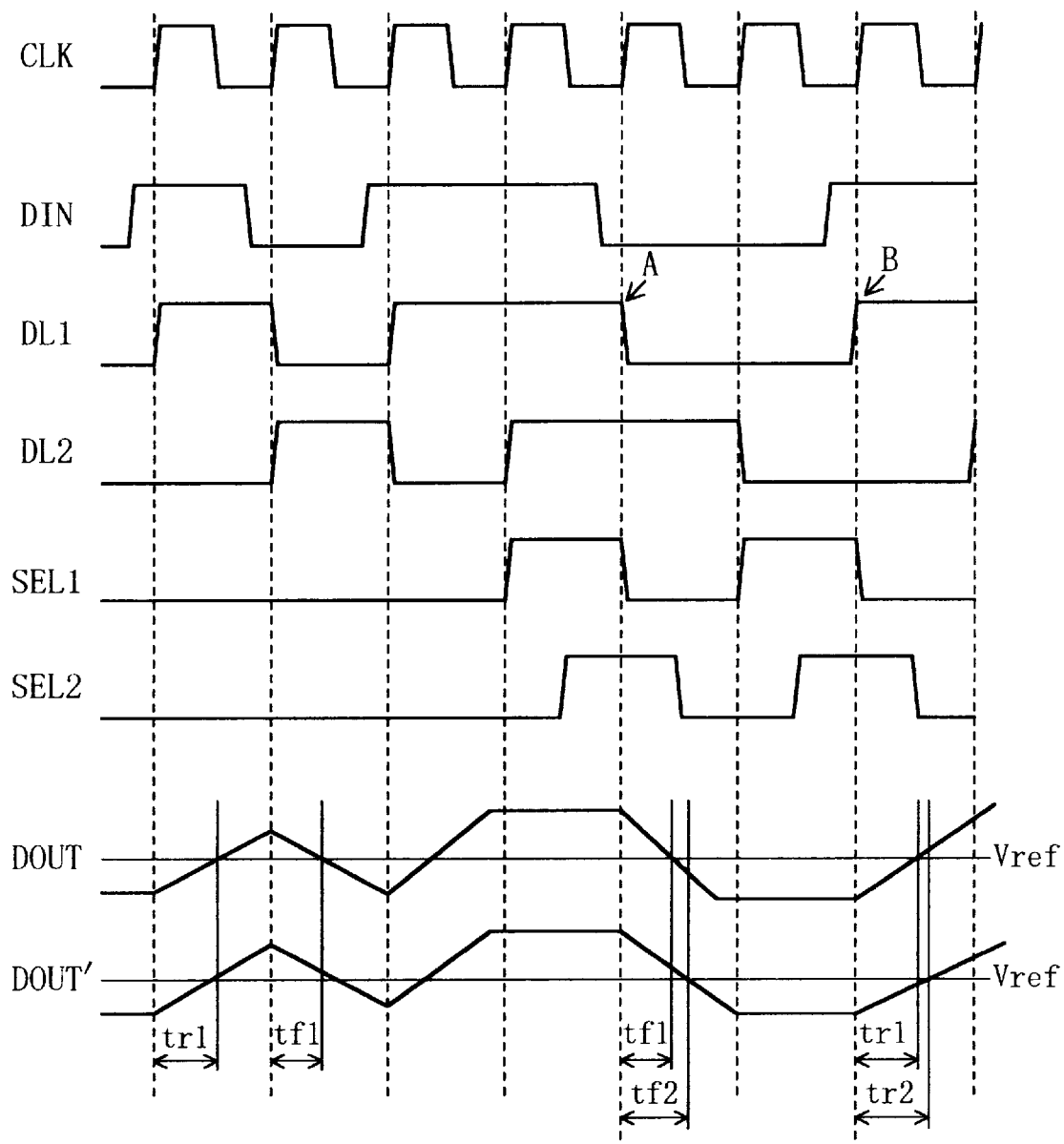
FIG. 4 is a timing diagram illustrating the operation of the output buffer circuit.
Figure 5:
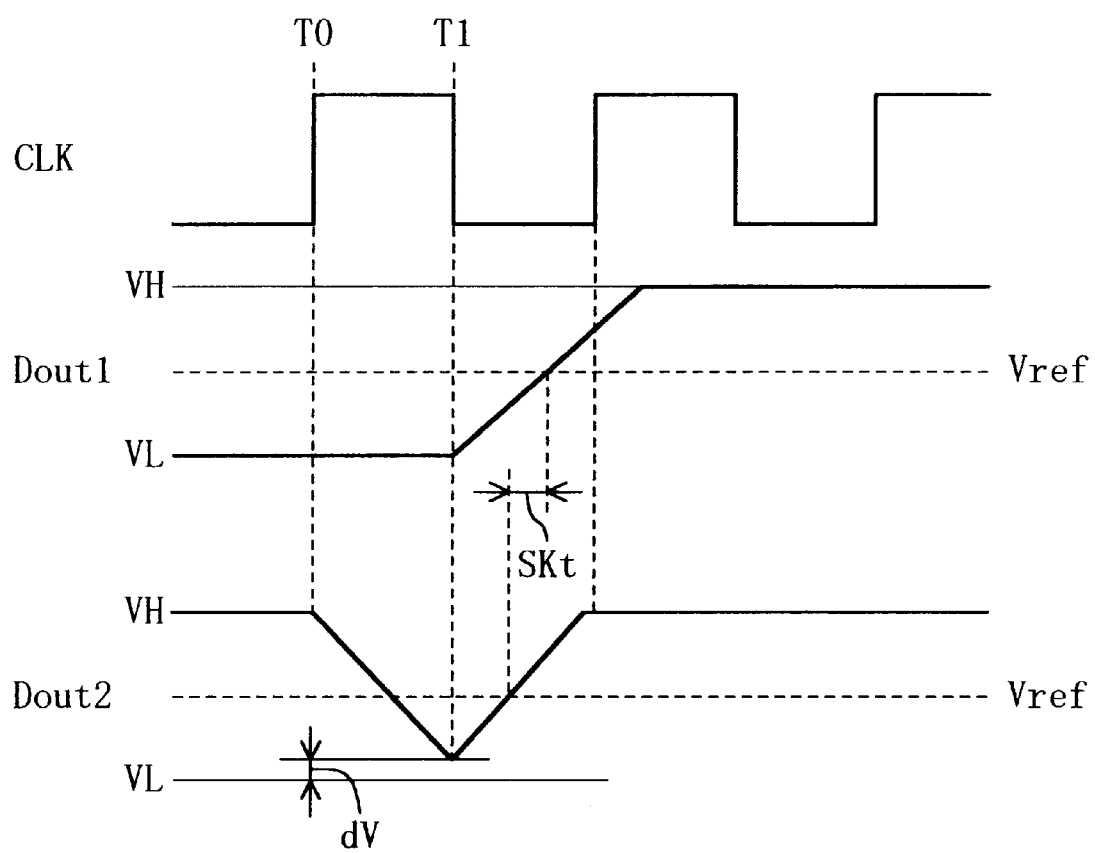
FIG. 5 is a timing diagram illustrating how the logical state transition interval of an input signal varies with the length of the stable-state interval of the input signal.

The internal configuration of the stable-state interval detector 14 will be described. The stable-state interval detector 14 includes first and second latch circuits 20 and 21, which are both implemented as D latches, operate in response to a clock signal CLK and take in a signal in synchronism with the rising edge of the clock signal CLK. The first latch circuit 20 latches the logical state of the input signal DIN and outputs the logical state latched. Accordingly, the output DL1 of the first latch circuit 20 is a signal obtained by delaying a rising edge of the input signal DIN to be synchronized with an associated rising edge of the clock signal CLK as shown in FIG. 4. On the other hand, the second latch circuit 21 latches the output DL1 of the first latch circuit 20 and outputs the logical state latched. Thus, the output DL2 of the second latch circuit 21 is a signal obtained by delaying the output signal DL1 of the first latch circuit 20 for one cycle of the clock signal CLK as shown in FIG. 4.

The stable-state interval detector 14 further includes a comparator 23 for receiving and comparing the respective outputs DL1 and DL2 of the first and second latch circuits 20 and 21. As shown in FIG. 4, if these inputs DL1 and DL2 are in the same logical state, then the comparator 23 outputs an H-level select signal SEL1. Conversely, if these inputs DL1 and DL2 are in opposite logical states, then the comparator 23 outputs an L-level select signal SEL1. That is to say, the comparator 23 compares the logical state DL1 of the input signal DIN at a rising edge (i.e., a time when a signal is taken in) of the clock signal CLK with the logical state DL2 of the input signal DIN at the previous rising edge thereof. Based on the results of comparison, the comparator 23 detects a state where the logical state of the input signal DIN remains the same for two cycles of the clock signal CLK. Then, the comparator 23 determines that the stable-state interval of the input signal DIN is long, thus outputting the H-level select signal SEL1.

The predetermined delay set by the delay circuit 11, i.e., the time for which the select signal SEL1 is delayed, is defined in this embodiment at about one half cycle of the clock signal CLK. This delay is determined such that if the logical state of the output signal DL1 of the first latch circuit 20 has remained the same for two consecutive cycles, the subsequent logical state transition thereof occurs (at a time A in FIG. 4) within an interval during which the H-level delayed select signal SEL2 is generated.

Figure 3:
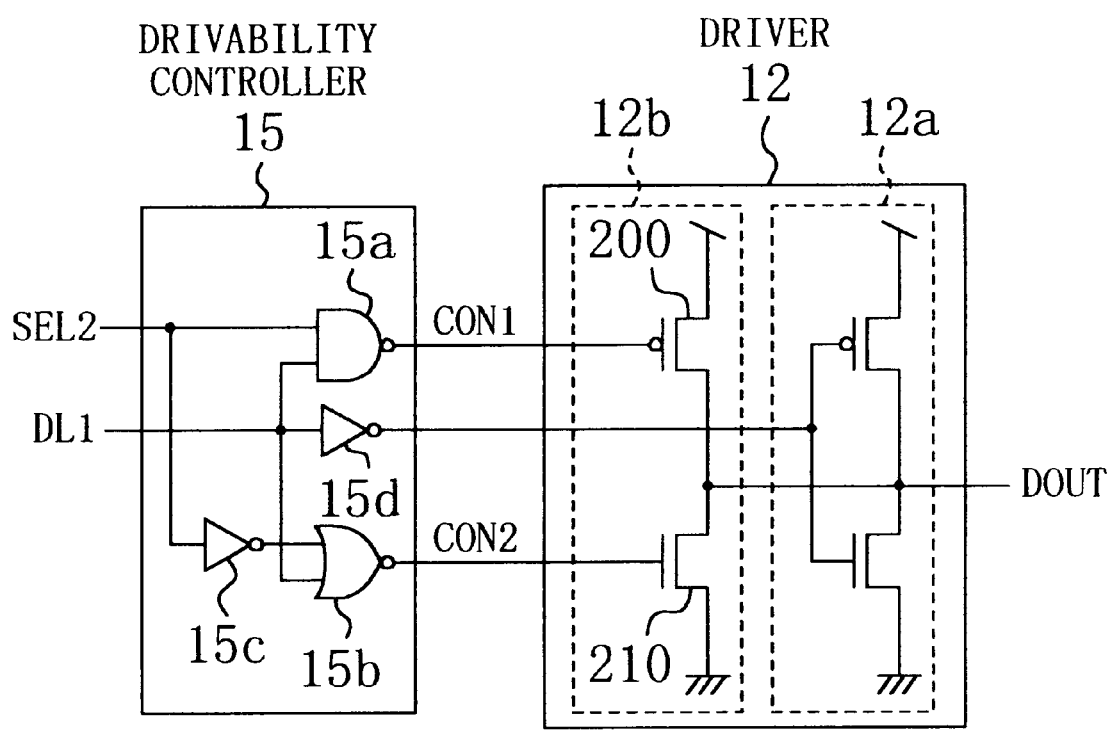
FIG. 3 is a diagram illustrating respective internal configurations of drivability controller and driver of the output buffer circuit.

Next, the internal configurations of the driver 12 and the drivability controller 15 will be described with reference to FIG. 3. As shown in FIG. 3, the driver 12 includes main and auxiliary drivers 12a and 12b, each having the same internal configuration. The main driver 12a receives a signal obtained by inverting the output signal DL1 of the first latch circuit 20, and drives the bus 6 with an output DOUT corresponding to the inverted signal. On the other hand, the auxiliary driver 12b receives outputs CON1 and CON2 of the drivability controller 15 and drives the bus 6 with the output DOUT corresponding to these signals.

As shown in FIG. 3, the drivability controller 15 includes a NAND gate 15a and a NOR gate 15b. The NAND gate 15a receives: the delayed select signal SEL2 output by the delay circuit 11; and the output signal DL1 of the first latch circuit 20. The output CON1 of the NAND gate 15a is supplied to a PMOS transistor 200 in the auxiliary driver 12b. The NOR gate 15b receives: a signal obtained by making an inverter 15c invert the delayed select signal SEL2 output by the delay circuit 11; and the output signal DL1 of the first latch circuit 20. The output CON2 of the NOR gate 15b is supplied to an NMOS transistor 210 in the auxiliary driver 12b. The drivability controller 15 further includes an inverter 15d for inverting the output signal DL1 of the first latch circuit 20, and the output of the inverter 15d is supplied to the main driver 12a.

Accordingly, the main driver 12a always operates responsive to the output signal DL1 of the first latch circuit 20. In contrast, only while the delayed select signal SEL2 supplied from the delay circuit 11 is at H level, i.e., only when the logical state of the input signal DIN remains the same for two consecutive cycles (i.e., the stable-state interval is long), the auxiliary driver 12b operates responsive to the output signal DL1 of the first latch circuit 20. As a result, the ability of the driver 12 to drive the bus 6 is increased.

It should be noted that the driver 12 may be configured in any of various other ways. For example, these two drivers 12a and 12b may be operated continuously, excepting while the delayed select signal SEL2 supplied from the delay circuit 11 is at L level (i.e., the stable-state interval is short). In such a state, the operation of the auxiliary driver 12b may be stopped and the ability of the driver 12 to drive the bus 6 may be decreased. Also, it may be arbitrarily determined which type of stable-state interval, i.e., longer one or shorter one, is used as a reference. For instance, if the transition of an input signal DIN is relatively frequent, then the shorter stable-state interval may be used as a reference. Furthermore, the drivability of the driver 12 may be changed based on the frequency of the clock signal CLK, the load capacitance of the bus 6, etc. to cope with skewing of various lengths dependent on the length of the stable-state interval of the signal DIN.

In this embodiment, if the logical state of the input signal DIN changes every cycle of the clock signal CLK, i.e., if the stable-state interval of the input signal DIN is shorter, then the stable-state interval detector 14 outputs the L-level select signal SEL1. And the drivability controller 15 stops the operation of the auxiliary driver 12b by supplying the output signals CON1 and CON2 thereto. Thus, only the main driver 12a operates responsive to the output signal DL1 of the first latch circuit 20 and the drivability is controlled at a normal value.

Alternatively, if the logical state of the input signal DIN remains the same for two consecutive cycles of the clock signal CLK, i.e., if the stable-state interval of the input signal DIN is longer, then the stable-state interval detector 14 outputs the H-level select signal SEL1. And the drivability controller 15 activates the auxiliary driver 12b by supplying the output signals CON1 and CON2 thereto. As a result, the drivability of the driver 12 is increased, because not only the ability of the main driver 12a but also that of the auxiliary driver 12 are taken advantage of simultaneously. Thus, if the logical state of the output signal DL1 of the first latch circuit 20 has remained the same for two consecutive cycles, then the output waveform DOUT of the driver 12 are more abrupt than the output waveform DOUT' of a conventional driver at the subsequent logical state transition times (A and B in FIG. 4). That is to say, a time tf1 taken for the waveform DOUT to fall and reach a reference voltage Vref is shorter than a time tf2 taken for the waveform DOUT' to fall and reach the voltage Vref. In the same way, a time tr1 taken for the waveform DOUT to rise and reach the voltage Vref is shorter than a time tr2 taken for the waveform DOUT' to rise and reach the voltage Vref. Consequently, the time taken to reach the reference voltage Vref is the same (tf1=tr1) in this embodiment whether the logical state of the signal DIN changes every cycle or remains the same for two cycles as shown in FIG. 4. Consequently, skewing can be eliminated.

In the foregoing embodiment, the drivability of the driver 12 is controlled at two steps. However, the drivability may be naturally controlled at three or more steps if necessary. For example, if a plurality of reference voltages Vref should be used on the signal receiving end for determining whether the level of the signal is H or L, then the drivability may be controlled at a corresponding number of steps. In this case, the stable-state interval detector 14 detects how long the stable-state interval of the signal DIN is, i.e., for how many number of cycles the logical state of the signal DIN remains the same, and then outputs a select signal, corresponding to the length detected, to the driver 12.

Also, in the foregoing embodiment, the signal DIN is supposed to be taken in at the rising edge of the clock signal CLK. However, the present invention is not limited thereto. Alternatively, the signal may be taken in either at the falling edge of the clock signal CLK or at both the rising and falling edges of the clock signal CLK.

What is claimed is:

1. A skewing-suppressive output buffer circuit comprising:

means for driving a bus based on a logical state of an input signal;

means, receiving the input signal in response to a clock signal, for detecting a stable-state interval during which the input signal remains in the same logical state and outputting a signal indicating results of the detection; and means, responsive to the output signal of the detecting means, for controlling the drivability of the driving means based on the length of the stable-state interval detected by the detecting means.

2. The circuit of claim 1, wherein the control means increases the drivability of the driving means if the stable-state interval detected by the detecting means is long.

3. The circuit of claim 1, wherein the detecting means compares a logical state of the input signal, taken in at a predetermined edge of the clock signal, with that of the input signal, taken in at the previous edge of the clock signal, thereby detecting the stable-state interval of the input signal.

4. The circuit of claim 3, wherein the detecting means comprises:

first and second latch circuits operating in synchronism with the predetermined edge of the clock signal; and a comparator, wherein the first latch circuit latches and outputs the logical state of the input signal, while the second latch circuit latches and outputs the logical state output by the first latch circuit, and wherein the comparator compares the logical states output by the first and second latch circuits with each other and outputs results of comparison to the control means.

5. The circuit of claim 1, further comprising means for delaying the signal output from the detecting means to the control means for a predetermined time, wherein the predetermined time is set by the delay means such that the drivability of the driving means is changed in synchronism with a logical state transition of the input signal occurring for the first time after the detecting means has detected the stable-state interval.

6. The circuit of claim 1, wherein a plurality of semiconductor integrated circuits, among which signals are transmitted and received, are connected to the bus driven by the driving means.

* * * * *